United States Patent
Runger et al.

(10) Patent No.: US 11,105,458 B2
(45) Date of Patent: Aug. 31, 2021

(54) POST INSTALLATION LEVELING DEVICE

(71) Applicant: Ergotron, Inc., St. Paul, MN (US)

(72) Inventors: George Charles Willard Runger, Chandler, AZ (US); Michael Patrick Murphy, Scottsdale, AZ (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 16/490,421

(22) PCT Filed: Jul. 18, 2018

(86) PCT No.: PCT/US2018/042612
§ 371 (c)(1),
(2) Date: Aug. 30, 2019

(87) PCT Pub. No.: WO2019/018477
PCT Pub. Date: Jan. 24, 2019

(65) Prior Publication Data
US 2020/0132245 A1 Apr. 30, 2020

Related U.S. Application Data

(60) Provisional application No. 62/534,408, filed on Jul. 19, 2017.

(51) Int. Cl.
*F16M 11/04* (2006.01)
*F16M 11/10* (2006.01)
(Continued)

(52) U.S. Cl.
CPC .......... *F16M 11/10* (2013.01); *F16M 11/041* (2013.01); *A47F 5/0006* (2013.01); *A47F 5/08* (2013.01)

(58) Field of Classification Search
USPC ....... 248/489, 466, 490, 494, 495, 317, 323, 248/327, 339, 917, 918, 919, 920;
(Continued)

(56) References Cited

U.S. PATENT DOCUMENTS

| 7,639,499 B1 | 12/2009 | Campbell et al. |
| 7,823,847 B2 * | 11/2010 | Bremmon .............. F16M 13/02 248/201 |

(Continued)

FOREIGN PATENT DOCUMENTS

| CN | 2444360 Y | 8/2001 |
| CN | 2643576 Y | 9/2004 |

(Continued)

OTHER PUBLICATIONS

"International Application Serial No. PCT/US2018/042612, International Search Report dated Oct. 2, 2018", 2 pgs.

(Continued)

*Primary Examiner* — Alfred J Wujciak
(74) *Attorney, Agent, or Firm* — Schwegman Lundberg & Woessner, P.A.

(57) ABSTRACT

A wall mounting bracket assembly can be adapted to support an electronic display. The bracket assembly can include a support frame that includes a first support rail, and the support frame can be adapted to couple to a vertical surface. The bracket assembly can include one or more leveling assemblies. The one or more leveling assemblies can include a hook portion adapted to engage with the first support rail. The one or more leveling assemblies can include a first pair of support plates and a first leveling plate positioned between the first pair of support plates. The first pair of support plates can be adapted to translate with respect to the first leveling plate. The one or more leveling assemblies can include a driving block configured to engage with the first leveling plate and to translate the first pair of support plates with respect to the first leveling plate.

13 Claims, 13 Drawing Sheets

(51) Int. Cl.
*A47F 5/08* (2006.01)
*A47F 5/00* (2006.01)

(58) Field of Classification Search
USPC ............. 361/679.01, 679.22, 679.02, 679.27
See application file for complete search history.

(56) References Cited

U.S. PATENT DOCUMENTS

| | | | | |
|---|---|---|---|---|
| 7,857,270 | B2* | 12/2010 | Short | F16M 11/10 |
| | | | | 248/284.1 |
| 8,456,808 | B2* | 6/2013 | Grey | F16M 11/10 |
| | | | | 361/679.01 |
| 8,550,415 | B2* | 10/2013 | Sculler | F16M 13/02 |
| | | | | 248/298.1 |
| 9,388,938 | B2 | 7/2016 | Molter | |
| 2009/0200439 | A1 | 8/2009 | Bremmon et al. | |
| 2010/0309615 | A1 | 12/2010 | Grey et al. | |
| 2011/0234926 | A1 | 9/2011 | Smith | |
| 2012/0002393 | A1 | 1/2012 | Stanek et al. | |
| 2016/0120309 | A1* | 5/2016 | Brandt | F16M 11/18 |
| | | | | 361/679.01 |

FOREIGN PATENT DOCUMENTS

| | | |
|---|---|---|
| CN | 2792057 Y | 6/2006 |
| CN | 102859253 A | 1/2013 |
| CN | 1098040193 A | 5/2019 |

OTHER PUBLICATIONS

"International Application Serial No. PCT/US2018/042612, Written Opinion dated Oct. 2, 2018", 6 pgs.

"Chinese Application Serial No. 201880001112.5, Office Action dated Mar. 31, 2020", w/ English Translation, 12 pgs.

"International Application Serial No. PCT/US2018/042612, International Preliminary Report Patentability dated Jan. 30, 2020", 8 pgs.

"Chinese Application Serial No. 201880001112.5, Office Action dated Dec. 3, 2020", w/ English translation, 5 pgs.

"Chinese Application Serial No. 201880001112.5, Response filed Feb. 18, 2021 to Office Action dated Dec. 3, 2020", w/English claims, 12 pgs.

"Chinese Application Serial No. 201880001112.5, Response to Examiner Telephone Interview filed Mar. 31, 2021", w/English claims, 68 pgs.

\* cited by examiner

POST INSTALLATION LEVELING DEVICE

CLAIM OF PRIORITY

This application is a U.S. National Stage Patent Application which claims priority to Application Serial Number PCT/US2018/042612, titled "POST INSTALLATION LEVELING DEVICE" to George Charles Willard Runger et al., filed on Jul. 18, 2018, and published on Jan. 24, 2019 as WO 2019/018477 A1, which claims the benefit of priority of U.S. Provisional Patent Application Ser. No. 62/534,408, titled "POST INSTALLATION LEVELING DEVICE" to George Charles Willard Runger et al., filed on Jul. 19, 2017, the entire contents of which being incorporated herein by reference.

FIELD OF THE DISCLOSURE

This disclosure relates generally to a mounting system for attaching equipment to a surface, including (but not limited to) a vertical wall.

BACKGROUND

An electronic display (e.g., a monitor, a television, or the like) can include a stand to support the electronic display. A user can position the electronic display on a wall, for instance to improve the ability to view an image produced by the electronic display.

SUMMARY OF THE DISCLOSURE

Figure 1:
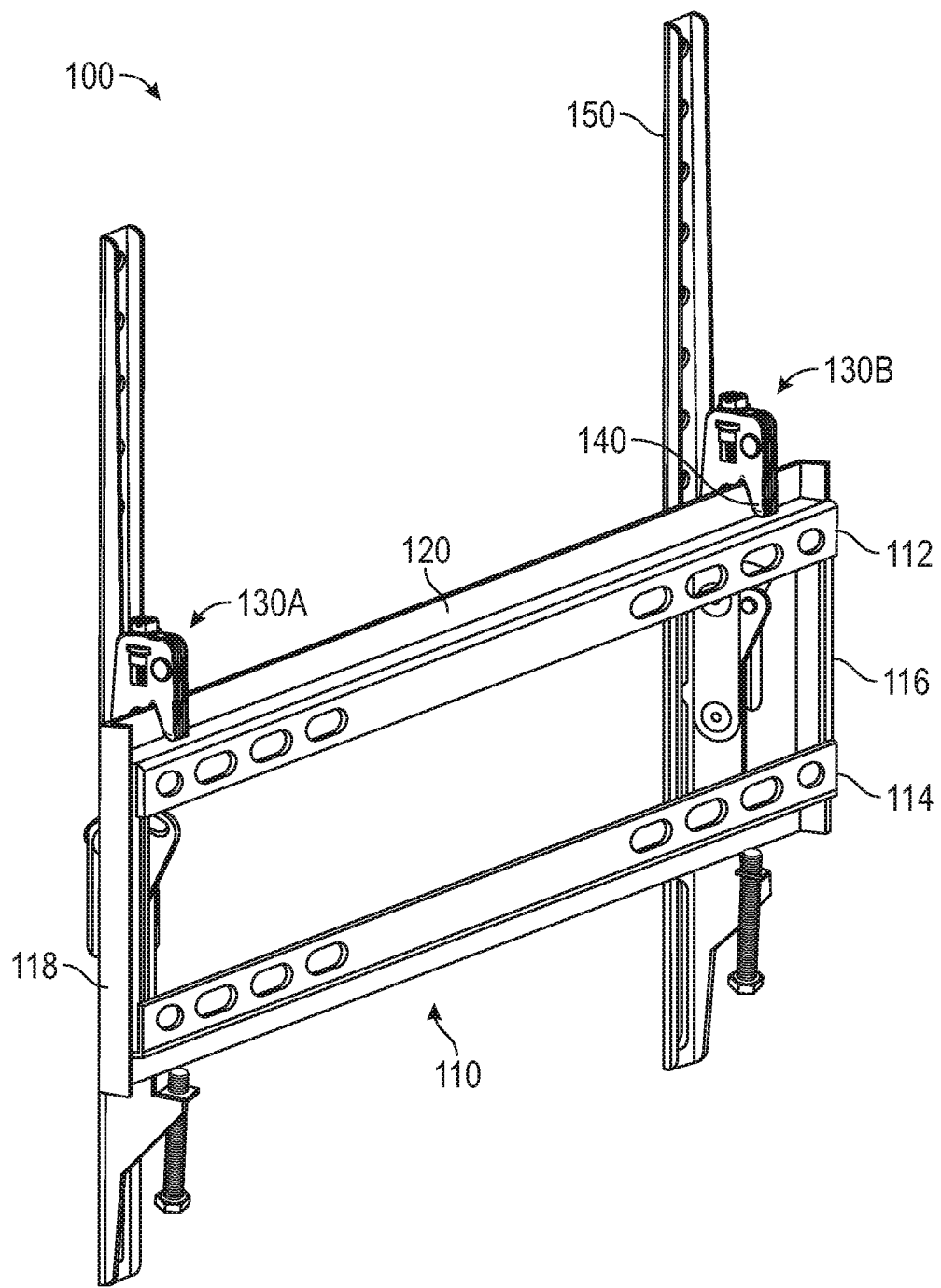
FIG. 1 illustrates a wall mounting bracket assembly.

This disclosure is directed to, among other things, a low-cost post installation leveling device for electronic displays, e.g., flat panel TVs and monitors. In some example implementations, the device can comply with standards promulgated by the Video Electronics Standards Association (VESA).

Aspect 1 can include or use subject matter (such as an apparatus, a system, a device, a method, a means for performing acts, or a device readable medium including instructions that, when performed by the device, can cause the device to perform acts, or an article of manufacture), such as can include or use a wall mounting bracket assembly adapted to support an electronic display, comprising: a support frame adapted to couple to a vertical surface, the support frame including a first support rail; a first leveling assembly having a first hook portion adapted to engage with the first support rail, the first leveling assembly including: a first pair of support plates; a first leveling plate positioned between the first pair of support plates, the first pair of support plates adapted to translate with respect to the first leveling plate, and a first adjustment assembly, including a driving block configured to engage with the first leveling plate and to translate the first pair of support plates with respect to the first leveling plate; and a second leveling assembly having a second hook portion adapted to engage with the first support rail, the second hook assembly including: a second pair of support plates; a second leveling plate positioned between the second pair of support plates, the second pair of support plates adapted to translate with respect to the second leveling plate, and a second adjustment assembly, including a second driving block configured to engage with the second leveling plate and to translate the second pair of support plates with respect to the second leveling plate.

Aspect 2 can include or use, or can optionally be combined with the subject matter of Aspect 1, to optionally include or use wherein: the first pair of support plates includes: a first support plate defining a first socket and positioned on a first side of the first leveling plate, a second support plate defining a second socket and positioned on a second side of the first leveling plate; and wherein the first adjustment assembly includes a first adjustor having a flange, and a portion of the flange is configured to be positioned in the first socket and the second socket.

Aspect 3 can include or use, or can optionally be combined with the subject matter of Aspect 2 to optionally include or use wherein: the driving block is positioned between the first support plate and the second support plate, the driving block is adapted to translate in the first socket and the second socket, and wherein the first adjustor engages with the driving block to translate the first leveling plate with respect to the first support plate and the second support plate.

Aspect 4 can include or use, or can optionally be combined with the subject matter of Aspect 3 to optionally include or use wherein the first driving block includes: a first portion positioned in the first socket, a second portion positioned in the second socket, a third portion positioned between the first support plate and the second support plate, a fourth portion positioned between the first support plate and the second support plate, and wherein the third portion and the fourth portion engage with the first leveling plate to translate the first leveling plate with respect to the first support plate and the second support plate.

Aspect 5 can include or use, or can optionally be combined with the subject matter of one or any combination of Aspects 3 or 4 to optionally include or use wherein the first leveling plate is configured to translate with respect to the flange of the first adjustor.

Aspect 6 can include or use, or can optionally be combined with the subject matter of one or any combination of Aspects 2 through 5 to optionally include or use wherein the first leveling plate defines a recess configured to receive a shank of the first adjustor.

Aspect 7 can include or use, or can optionally be combined with the subject matter of one or any combination of Aspects 2 through 6 to optionally include or use wherein the first driving block translates along a shank of the first adjustor.

Aspect 8 can include or use, or can optionally be combined with the subject matter of one or any combination of Aspects 2 through 7 to optionally include or use wherein: the first leveling plate defines a first slot and a second slot, the first leveling assembly includes: a first coupling member positioned in the first slot, a second coupling member positioned in the second slot, and wherein the first coupling member and the second coupling member couple the first support plate, the first leveling plate, and the second support plate; and wherein the first coupling member and the second coupling member are adapted to translate within the first slot and the second slot, respectively.

Aspect 9 can include or use, or can optionally be combined with the subject matter of Aspect 8 to optionally include or use wherein the first slot is laterally offset from the second slot.

Aspect 10 can include or use, or can optionally be combined with the subject matter of one or any combination of Aspects 2 through 9 to optionally include or use a first spacer and a second spacer, wherein the first spacer is positioned between the first support plate and the first leveling plate, and the second spacer is positioned between the second support plate and the first leveling plate.

Aspect 11 can include or use subject matter (such as an apparatus, a system, a device, a method, a means for performing acts, or a device readable medium including instructions that, when performed by the device, can cause the device to perform acts, or an article of manufacture), such as can include or use a leveling assembly for an electronic display, comprising: a hook portion adapted to engage with a support rail; a pair of support plates; a leveling plate positioned between the pair of support plates, the pair of support plates adapted to translate with respect to the leveling plate, and an adjustment assembly, including a driving block configured to engage with the leveling plate and to translate the pair of support plates with respect to the leveling plate.

Aspect 12 can include or use, or can optionally be combined with the subject matter of Aspect 11, to optionally include or use wherein: the pair of support plates includes: a first support plate defining a first socket and positioned on a first side of the leveling plate, a second support plate defining a second socket and positioned on a second side of the leveling plate; and wherein the adjustment assembly includes an adjustor having a flange, and a portion of the flange is configured to be positioned in the first socket and the second socket.

Aspect 13 can include or use, or can optionally be combined with the subject matter of Aspect 12 to optionally include or use wherein: the first driving block is positioned between the first support plate and the second support plate, the first driving block is adapted to translate in the first socket and the second socket, and wherein the first adjustor engages with the first driving block to translate the first leveling plate with respect to the first support plate and the second support plate.

Aspect 14 can include or use, or can optionally be combined with the subject matter of one or any combination of Aspects 12 or 13 to optionally include or use a first spacer positioned between the first support plate and the first leveling plate, a second spacer positioned between the second support plate and the first leveling plate, wherein the first leveling plate defines a recess configured to receive a shank of the first adjustor, and wherein the first spacer defines a notch configured to receive the shank of the first adjustor.

Aspect 15 can include or use, or can optionally be combined with the subject matter of Aspect 14 to optionally include or use wherein a portion of the driving block is positioned in the notch of the first spacer, and the portion of the driving block translates with respect to the first spacer.

Aspect 16 can include or use, or can optionally be combined with the subject matter of one or any combination of Aspects 12 through 15 to optionally include or use wherein the flange of the first adjustor is a first flange, and the first adjustor includes a second flange, and the first adjustor is configured to receive a portion of the first support plate or the second support plate between the first flange and the second flange.

Aspect 17 can include or use, or can optionally be combined with the subject matter of one or any combination of Aspects 11 through 16 to optionally include or use wherein the pair of support plates each include the hook portion.

Aspect 18 can include or use subject matter such as an apparatus, a system, a device, a method, a means for performing acts, or a device readable medium including instructions that, when performed by the device, can cause the device to perform acts, or an article of manufacture), such as can include or use a wall mounting bracket assembly adapted to support an electronic display, comprising: a support frame adapted to couple to a vertical surface, the support frame including a first support rail; a first leveling assembly having a first hook portion adapted to engage with the first support rail, the first leveling assembly including: a first pair of support plates, including: a first support plate defining a first socket and positioned on a first side of the first leveling plate, a second support plate defining a second socket and positioned on a second side of the first leveling plate; and wherein the first adjustment assembly includes a first adjustor having a flange, and a portion of the flange is configured to be positioned in the first socket and the second socket; a first leveling plate positioned between the first pair of support plates, the first support plate and the second support plate adapted to translate with respect to the first leveling plate, and a first adjustment assembly, including a driving block configured to engage with the first leveling plate and to translate the first support plate and the second support plate with respect to the first leveling plate, wherein: the driving block is positioned between the first support plate and the second support plate, the driving block is adapted to translate in the first socket and the second socket, and wherein the first adjustor engages with the driving block to translate the first leveling plate with respect to the first support plate and the second support plate; and a second leveling assembly having a second hook portion adapted to engage with the first support rail, the second hook assembly including: a second pair of support plates; a second leveling plate positioned between the second pair of support plates, the second pair of support plates adapted to translate with respect to the second leveling plate, and a second adjustment assembly, including a second driving block configured to engage with the second leveling plate and to translate the second pair of support plates with respect to the second leveling plate.

Aspect 19 can include or use, or can optionally be combined with the subject matter of Aspect 18, to optionally include or use wherein the driving block is in threaded engagement with the first adjustor.

Aspect 20 can include or use, or can optionally be combined with the subject matter of one or any combination of Aspects 18 or 19 to optionally include or use a display bracket configured to tilt with respect to the first leveling assembly.

Aspect 21 can include or use, or can optionally be combined with the subject matter of one or any combination of Aspects 18 through 20 to optionally include or use a display bracket including a sliding retention bracket configured to couple the display bracket with the support frame, wherein: the display bracket defines a bracket channel sized and shaped to receive the sliding retention bracket, and the sliding retention bracket is positioned in the bracket channel, and the sliding retention bracket is slidably coupled with the display bracket.

Aspect 22 can include or use, or can optionally be combined with any portion or combination of any portions of any one or more of Aspects 1 through 21 to include or use, subject matter that can include means for performing any one or more of the functions of Aspects 1 through 21, or a machine-readable medium including instructions that, when performed by a machine, cause the machine to perform any one or more of the functions of Aspects 1 through 21.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

DETAILED DESCRIPTION

The present inventors have recognized, among other things, that a problem to be solved can include leveling an electronic display (e.g., a television, a monitor, or the like) with respect to a horizontal surface (e.g., a floor, a ceiling, a mantle, the ground, a support frame, or the like). The present subject matter can help provide a solution to this problem, such as with a wall mounting bracket assembly that includes one or more leveling assemblies (e.g., the one or more leveling assemblies 130 shown in FIG. 1). The one or more leveling assemblies can change the position (or orientation) of the electronic display with respect to the horizontal surface. The one or more leveling assemblies can include a leveling plate (e.g., the leveling plate 310 shown in FIG. 3) and the leveling plate 310 may engage with a support frame (e.g., the support frame 110 shown in FIG. 1) and the engagement with the support frame may allow for the one or more leveling assemblies to translate with respect to the support frame.

FIG. 1 illustrates a wall mounting bracket assembly 100. In general, the wall mounting bracket assembly 100 can be used to mount an electronic display (e.g., a monitor, a television, or the like) to a building panel (e.g., the wall 200 of FIG. 2). The wall mounting bracket assembly 100 can include a support frame 110, and the support frame 110 can be configured to couple to a vertical surface, including (but not limited to) the building panel. The support frame 110 includes a mounting surface 111 that is configured to mate with the vertical surface. The support frame 110 can define one or more mounting holes adapted to receive a fastener, and the fastener can engage with the support frame 110 and the building panel to couple the support frame 110 to the building panel. For clarity, the building panel and the electronic display are not shown in FIG. 1.

The support frame 110 can include a first horizontal member 112 and can include a second horizontal member 114. The first horizontal member 112 and the second horizontal member 114 can be spaced apart in a vertical direction. A first vertical member 116 and/or a second vertical member 118 can be coupled to, and can interconnect, the first horizontal member 112 and the second horizontal member 114.

The support frame 110 includes a first support rail 120. In one example, the first support rail 120 is included in the first horizontal member 112, but the present subject matter is not so limited. The first support rail 120 can project from the support frame 110. The first support rail 120 can be offset from the mounting surface 111. In an example, the support frame 110 can include a channel 113, the first support rail 120 can be positioned on a first side of the channel 113, and the mounting surface 111 can be positioned on a second side of the channel 113.

The wall mounting bracket assembly 100 can include one or more leveling assemblies, including (but not limited to) a first leveling assembly 130A and a second leveling assembly 130B. The one or more leveling assemblies are adapted to engage with the first support rail 120. For instance, the first leveling assembly 130A and the second leveling assembly 130B (referred to collectively in this disclosure as "leveling assemblies 130") can include a hook portion 140. The hook portion 140 can be adapted to engage with the first support rail 120. For example, the hook portion 140 can project from the first leveling assembly 130A, and the hook portion can be positioned in the channel 113. The hook portion 140 can help couple (e.g., hang) the first leveling assembly 130A (and the second leveling assembly 130B) to the support frame 110.

Referring again to FIG. 1, the one or more leveling assemblies 130 can be configured to level an electronic display supported by the wall mounting bracket assembly 100. For example, a display bracket 150 can be configured to couple with the electronic display e.g., the display bracket 150 can be a VESA compatible bracket), such as a television, computer monitor, or other electronic display. In an example, the first leveling assembly 130A includes the display bracket 150 and the first leveling assembly is coupled to a first side of the electronic display. Additionally, the second leveling assembly 130B includes the display bracket 150, and the second leveling assembly 130B is coupled to a second side of the electronic display. As described in greater detail in this document, the one or more leveling assemblies 130 help allow for an adjustment of a position (or orientation) of the electronic display with respect to the support frame 110 (and the building panel).

In some examples, the support frame 110 is coupled to the vertical surface, and the support frame 110 is not level when coupled to the vertical surface of the building panel. For example, the support frame 110 is coupled to the vertical surface and the channel 113 is not parallel (or substantially parallel) to a horizontal surface (e.g., a floor or a ceiling of a building). The one or more leveling assemblies 130 can translate with respect to the support frame 110, and the one or more leveling assemblies 130 can help adjust the position (or orientation) of the electronic display.

The one or more leveling assemblies 130 can help improve the aesthetics of the electronic display supported by the wall mounting bracket assembly 100 because the electronic display supported by the wall mounting bracket assembly 100 can be positioned (or otherwise oriented) in a manner expected by viewers of the electronic display. For example, a viewer of the electronic display can dislike viewing an unlevel (e.g., crooked, canted, or the like) electronic display. The one or more leveling assemblies 130 allow for the electronic display to be level when viewed by a user of the electronic display.

Additionally, the one or more leveling assemblies 130 can help improve user satisfaction with the wall mounting bracket assembly 100 because the one or more leveling assemblies 130 decrease the difficulty of installing the electronic display. In some examples, a user removes the electronic display from the vertical surface to level the electronic display. The one or more leveling assemblies 130 help allow the user to level the electronic display without removing the electronic display from the vertical surface.

Figure 2:
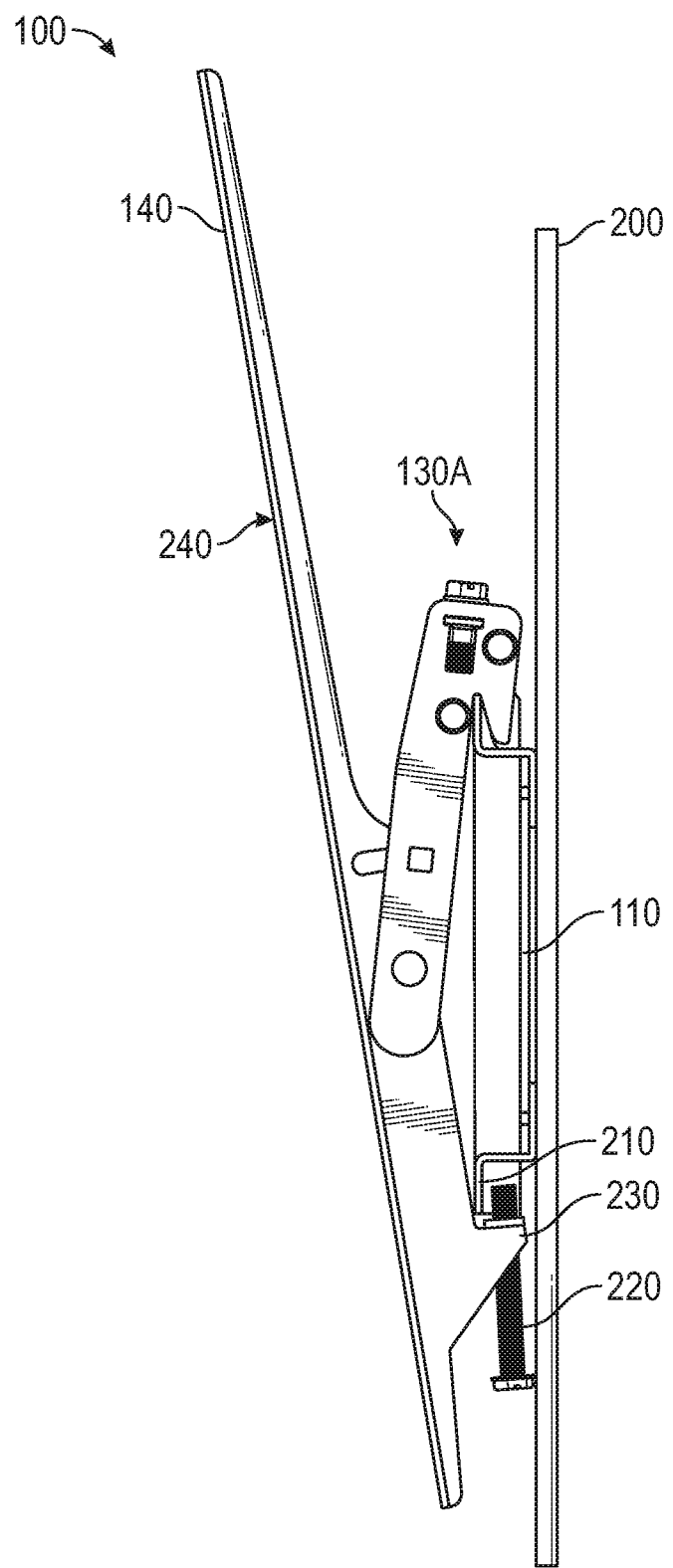
FIG. 2 depicts an example of a wall mounting bracket assembly in a tilted position.

FIG. 2 depicts an example of the wall mounting bracket assembly 100 in a tilted position. As discussed in this document, the support frame 110 is adapted to couple to a vertical surface, including (but not limited to) a wall 200. The first leveling assembly 130A and the second leveling assembly 130B (shown in FIG. 1) can be coupled to the support frame 110 (e.g., engaged with the first support rail 120). The first leveling assembly 130A can include the display bracket 150, and an electronic display can be coupled to the display bracket 150. In some examples, and as shown in FIG. 2, the display bracket 150 can be configured to tilt with respect to the wall 200 (e.g., a display mounting surface 240 is not parallel with, or is angled with respect to, the wall 200).

Referring again to FIG. 2, the support frame 110 can include a second support rail 210. The second support rail 210 can project from the support frame 110, and the second support rail 210 can be spaced from the mounting surface 111 (shown in FIG. 1) or the wall 200. The second support rail can help couple the first leveling assembly 130A with the support frame 110.

The wall mounting bracket assembly 100 can include a retention member 220, and the retention member 220 can help couple the first leveling assembly 130A (or the second leveling assembly 130B) to the support frame 110. For example, the display bracket 150 can be coupled to the first leveling assembly 130A. The display bracket 150 can include a tab 230. The tab 230 can define threads, and the retention member 220 can be threadingly engaged with the tab 230. The retention member 220 can be positioned between the second support rail 210 and the wall 200. The retention member 220 can engage with the support frame 110 (e.g., the second horizontal member 114, also shown in FIG. 1). In some examples, the hook portion 140 and the retention member 220 can cooperate to help couple the first leveling assembly 130A (or the second leveling assembly 130B, shown in FIG. 1) with the support frame 110.

Figure 3:
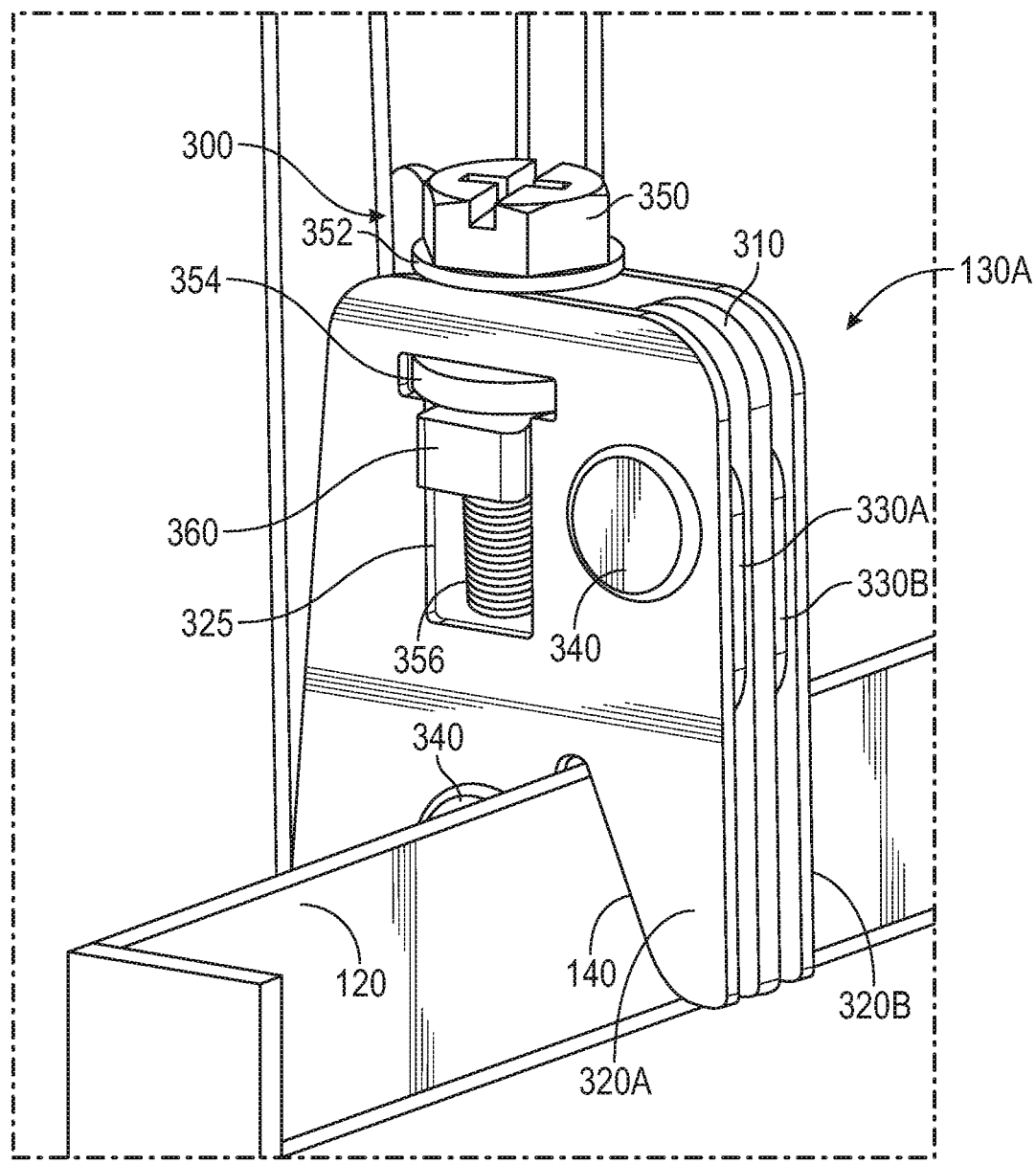
FIG. 3 depicts an example of a leveling assembly.

FIG. 3 depicts an example of the first leveling assembly 130A. The first leveling assembly 130A can include a leveling plate 310, a first support plate 320A, and can include a second support plate 320B. The leveling plate 310, the first support plate 320A, and the second support plate 320B can include the hook portion 140. The leveling plate 310, the first support plate 320A, and the second support plate 320B can engage with the first support rail 120.

The leveling plate 310 can be positioned between the first support plate 320A and the second support plate 320B. The first support plate 320A can be positioned on a first side of the leveling plate 310, and the second support plate 320B can be positioned on a second side of the leveling plate 310. As discussed in greater detail in this document, the first support plate 320A and the second support plate 320B can define a socket 325. The socket can be sized and shaped to receive a portion of an adjustor 300.

The first support plate 320A, the leveling plate 310, and the second support plate 320B can be positioned proximate each other. The first support plate 320A, the leveling plate 310, and the second support plate 320B can be coupled together, including (but not limited to) coupled to together with one or more coupling members 340 (e.g., shouldered rivets, threaded fasteners, welding, fusing, bonding, or the like).

The first leveling assembly 130A (or the second leveling assembly 130B) can include an adjustment assembly 300. An adjustor 350 can be included in the adjustment assembly 300, and a portion of the adjustor 350 can be positioned in the socket 325 of the first support plate 320A or the second support plate 320B. The adjustor 350 can include a first flange 352, a second flange 354, and a shank 356. In some examples, a portion of the second flange 354 can be positioned in the socket 325. Additionally, in an example, portions of the first support plate 320A and the second support plate 320B can be positioned between the first flange 352 and the second flange 354 of the adjustor 350. The positioning of the first support plate 320A and the second support plate 320B between the first flange 352 and the second flange 354 can operably couple the adjustor 300 to the first leveling assembly 130A. For instance, the adjustment assembly 300 can be configured to allow the adjustor 350 to rotate with respect to the first support plate 320A (or the second support plate 320B).

The first leveling assembly 130A (or the second leveling assembly 130B) can include a first spacer 330A, and can include a second spacer 330B. The first spacer 330A can be positioned between the leveling plate 310 and the first support plate 320A. The second spacer 330B can be positioned between the leveling plate 310 and the second support plate 320B. The first spacer 330A and the second spacer 330B can respectively space the first support plate 320A and the second support plate 320B from the leveling plate 310.

The first spacer 330A and the second spacer 330B can cooperate with the leveling plate 310 to help allow the adjustor 350 to be operably coupled to the first leveling assembly 130A. For instance, the first spacer 330A and the second spacer 330B can space the first support plate 320A from the second support plate 320B, and the spacing can allow for the adjustor 350 to translate (e.g., rotate) with respect to the first support plate 320A (or the second support plate 320B). A thickness of the leveling plate 310, the first spacer 330A, and the second spacer 330B (when coupled together) can substantially correspond to a thickness of the shank 356 of the adjustor 350.

Additionally, the first spacer 330A (or the second spacer 330B) can help allow for the translation of the leveling plate 310 with respect to the first support plate 320A and the second support plate 320B. For example, the first spacer 330A can include a material with a (comparatively) low coefficient of friction, and the material can help the reduce the amount of force necessary to translate the leveling plate 310 with respect to the first support plate 320A and the second support plate 320B.

Referring again to FIG. 3, the adjustment assembly 300 can include a driving block 360, The driving block 360 can engage with the leveling plate 310, and the driving block 360 can translate the leveling plate 310 with respect to the first adjustment assembly 130 (e.g., the first support plate 320A and the second support plate 320B). For example, the adjustor 350 can be engaged with the driving block 360 (e.g., a threaded engagement), and manipulation (e.g., rotation) of the adjustor 350) can cause a corresponding translation (e.g., vertical translation) of the driving block 360. In an example, the shank 356 of the adjustor 350 can define threads, and the driving block 360 can define threads that correspond to the threads defined by the shank 356. Manipulation of the adjustor 350 can cause the driving block 360 to translate along a length of the shank 356, and the manipulation of the adjustor 350 can vary the distance between the driving block, and the second flange 354 of the adjustor 350. The driving block 360 is engaged with the leveling plate 310, and the translation of the driving block 360 can cause a corresponding translation of the leveling plate 310.

A person having ordinary skill in the art will appreciate that the translation and movement of the components described in this document are relative in nature (e.g., dependent upon the frame of reference). For example, the driving block 360 can be configured to translate with respect to the adjustor 350 (e.g., vertically and/or rotatably). Accordingly, the adjustor 350 can be configured to translate (e.g., vertically and/or rotatably) with respect to the driving block 260. In another example, the leveling plate 310 can be configured to translate with respect to the first leveling assembly 130A. Accordingly the first leveling assembly 130A (e.g., the first support plate 320A and the second support plate 320B) can be configured to translate with respect to the leveling plate 310 (and the first support rail 120).

Referring again to FIG. 3, the adjustor 350 can be positioned in the socket 325 of the first support plate 320A and the second support plate 320B. The positioning of the adjustor in the socket 320 can maintain the position of the adjustor 350 with respect to the first support plate 320A and the second support plate 320B (although degrees of freedom, for instance rotation, can be present between the adjustor 350 and the first support plate 320A or the second support plate 320B). For example, the engagement of the second flange 354 of the adjustor 350 with the socket 325 of the first support plate 320A and the second support plate 320B can allow the position of the adjustor 350 with respect to the first support plate 320A and the second support plate 320B to remain substantially the same despite translation of the adjustor 350 (e.g., vertically or rotationally). In another example, the position of the position of the adjustor 350 with respect to the first support plate 320A and the second support plate 320B to remain substantially the same despite translation of the leveling plate 310.

The adjustor 350 can be manipulated (e.g., rotated), and the adjustor 350 can correspondingly translate with respect to the driving block 360 and the leveling plate 310. In an example, manipulation of the adjustor 350 translates the adjustor 350, and because portions of the adjustor 350 are received by the socket 325 of the first support plate 320A and the second support plate 320B, the first support plate 320A and the second support plate 320B correspondingly translate with the adjustor 350. The leveling plate 310 can engage with the first support rail 120, and the first support plate 320A and the second support plate 320B can translate with respect to the first support rail 120 with manipulation of the adjustor 350.

As described in this document, the one or more leveling assemblies 130 (e.g., the first leveling assembly 130A) are configured to level an electronic display supported by the wall mounting bracket assembly 100. The one or more leveling assemblies 130 can engage with the first support rail 120, and the one or more leveling assemblies 130 can change the position (or orientation) of the electronic display with respect to the support frame 110 (or, for example, a floor of a building). The translation of the first support plate 320A and the second support plate 320B when the first leveling assembly 130A is engaged with first support rail 120 can cause the position of the first leveling assembly 130A to change with respect to the first support rail 120. For example (and as described with reference to FIGS. 6 and 7), a height of the first leveling assembly 130A (e.g., a top edge of the first support plate 320A) can increase or decrease with respect to the first support rail 120 when the adjustment assembly 300 is manipulated, and the first support plate 320A and the second support plate 320B translate with respect to the leveling plate 310.

Figure 4:
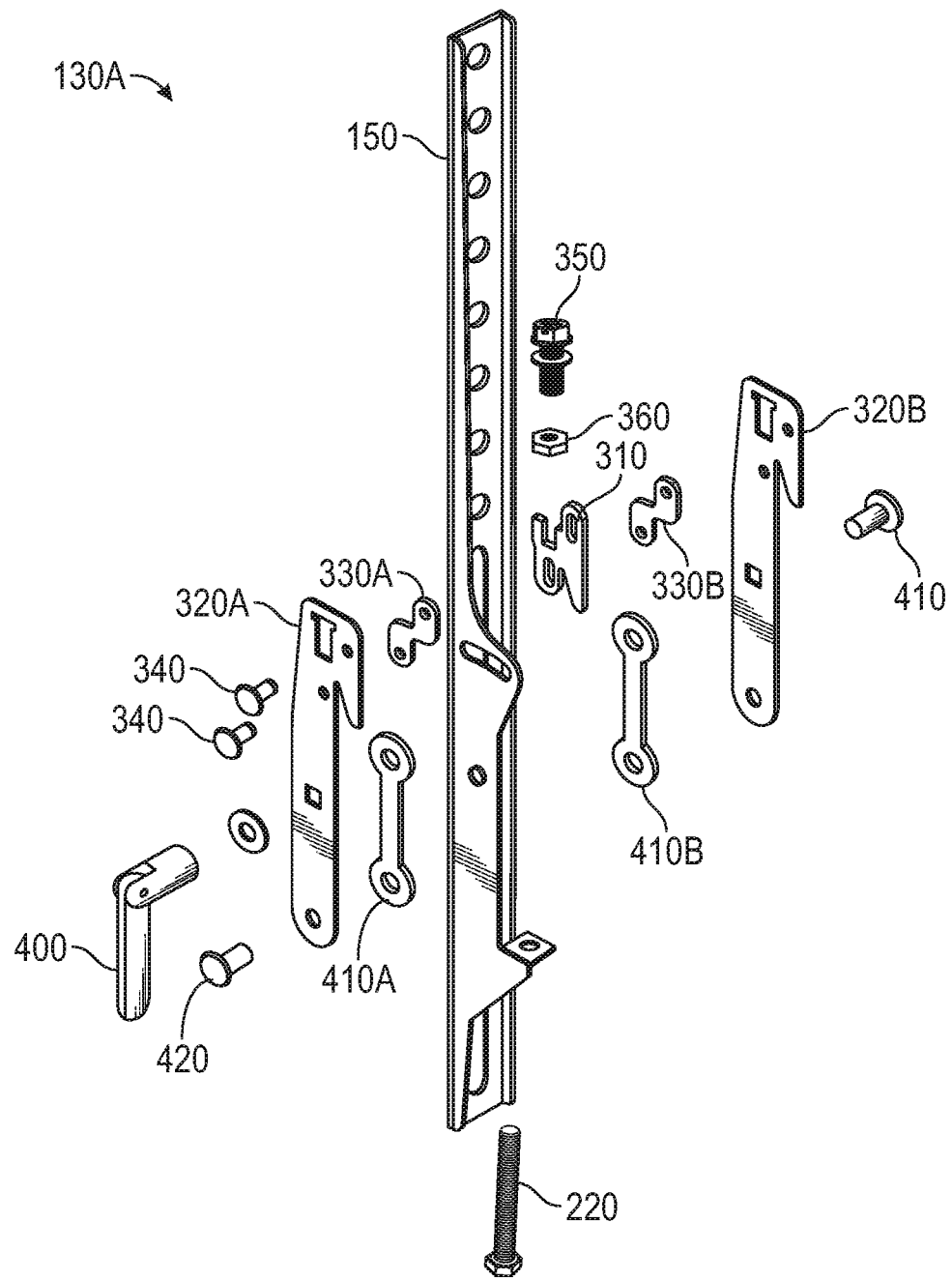
FIG. 4 depicts an example of the leveling assembly and a display bracket in an exploded view.

FIG. 4 depicts an example of the first leveling assembly 130A and the display bracket 150 in an exploded view. As discussed in this document, the wall mounting bracket assembly 100 can include one or more leveling assemblies 130, for instance, the first leveling assembly 130A. The first leveling assembly 130A can include the leveling plate 310, the first support plate 320A, the second support plate 320B, the first spacer 330A, the second spacer 330B, the one or more coupling members 340, the adjustor 350, and can include the driving block 360.

The first leveling assembly 130A can include a locking handle 400 and a locking member 410. The locking handle 400 can engage with the locking member 410 (e.g., in a threaded engagement) and the locking handle 400 can be adapted to substantially fix the position of the display bracket 150 (e.g., fixing the tilt of the display bracket 150 with respect to the wall 200, shown in FIG. 2). For example, the locking member 410 can include a threaded fastener, and the threaded fastener can be positioned in portions of the first leveling assembly 130A and the display bracket 150. The locking handle 400 can be engaged with the locking member 410, and manipulated to apply a force to (e.g., compress, squeeze, fasten, or the like) the display bracket 150 and the first leveling assembly 130A, and thereby help fix the position of the display bracket 150.

The first leveling assembly 130A can include a first bushing 420A and can include a second bushing 420B. In an example, the first bushing 420A or the second bushing 420B can be positioned between the first support plate 320A from the second support plate 320B. In another example, the first bushing 420A can be positioned between the first support plate 320A and the display bracket 150, and the second bushing 420B can be positioned between the display bracket 150 and the second support plate 320B. The first bushing 420A can define one or more openings that correspond in position (e.g., spacing, alignment, or the like) with other portions of the wall mounting bracket assembly 100 (e.g., the display bracket 150 and the first support plate 320A).

The first bushing 420A or the second bushing 420B can include a material with a low coefficient of friction. The first bushing 420A or the second bushing 420B can help the display bracket 150 translate (e.g., tilt) with respect to the first leveling assembly 130A (or the wall 200, shown in FIG. 2). For example, the first bushing 420A or the second bushing 420B can help reduce the amount of force necessary to translate the display bracket 150 with respect to the first leveling assembly 130A.

The first leveling assembly 130A can include an axle 430. The axle 430 can help the display bracket 150 translate (e.g., tilt) with respect to the first leveling assembly 130A. For example, the axle 430 can be positioned in portions (e.g., a through hole) of the display bracket 150 and the first leveling assembly 130A. The axle 430 can help the display bracket 150 rotate (e.g., tilt) with respect to the first leveling assembly 130A. Additionally, and similar to the one or more coupling members 340, the axle 430 can help couple the first leveling assembly 430 together.

Figure 5:
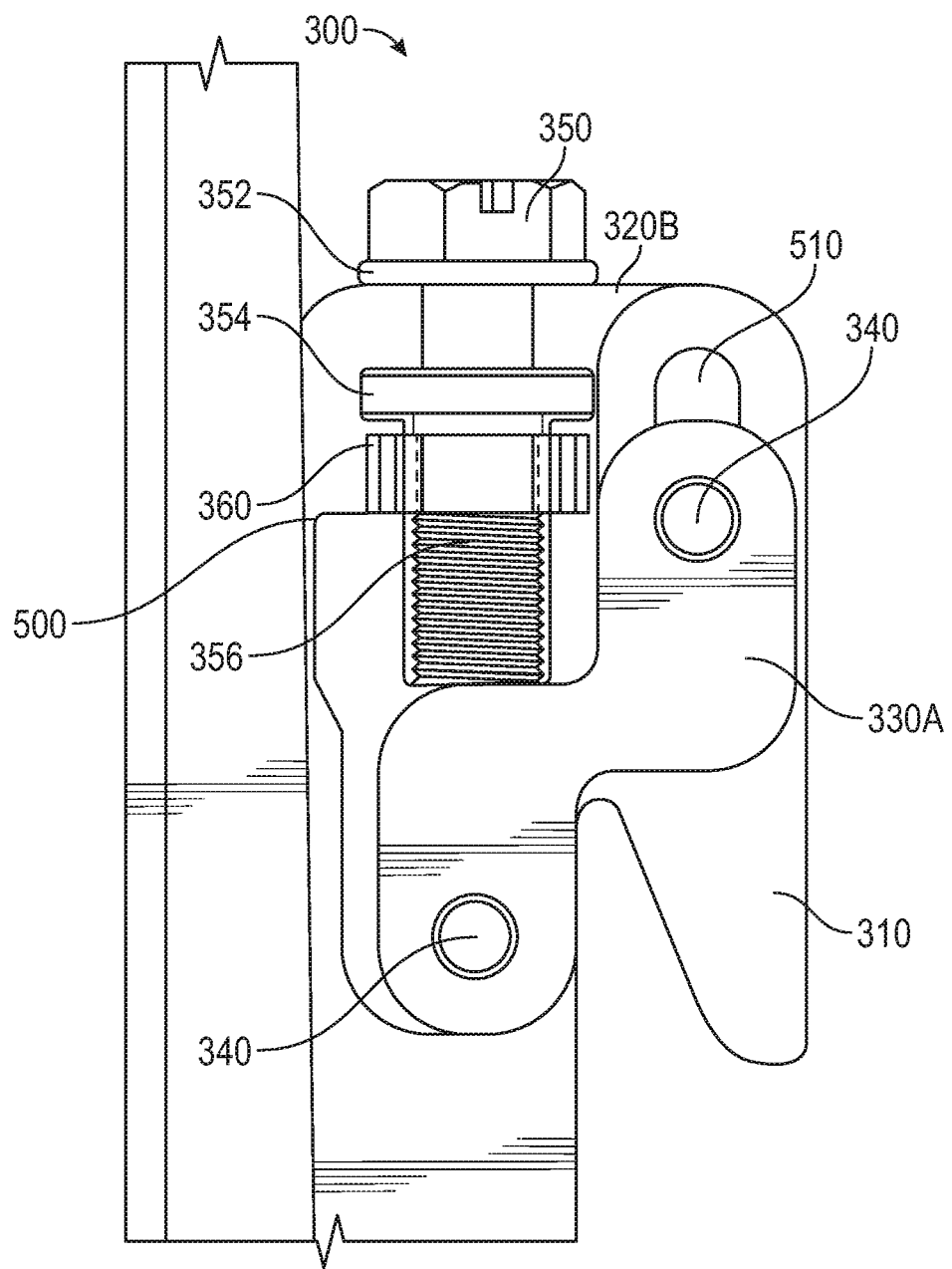
FIG. 5 depicts a cross-sectional view of an example of the leveling assembly.

FIG. 5 depicts a cross-sectional view of an example of the first leveling assembly 130A. As previously described in this document, and as shown in FIG. 5, a portion of the second support plate 320B can be positioned between the first flange 352 and the second flange 354 of the adjustor 350. The adjustor 350 can be manipulated (e.g., rotated) and the driving block 360 can translate with respect to the first leveling assembly 130A (e.g., translate along the shank 356 of the adjustor 350).

The driving block 360 can engage with an edge 500 of the leveling plate 310. The translation of the driving block 360 (and the engagement of the driving block 360 with the edge 500) can translate the leveling plate 500 with respect to the first leveling assembly 130A (e.g., translate with respect to the second support plate 320). As described in greater detail in this document, the first leveling assembly 130A can include one or more configurations that correspond to the position of the leveling plate 310 relative to first leveling assembly 130A (e.g., a raised or lowered position).

Referring again to FIG. 5, the one or more coupling members 340 can be positioned in a first slot 510 defined by the leveling plate 310 and the one or more coupling members can couple the first leveling assembly 130A together (e.g., in the configuration shown in FIG. 3). The first slot 510 can be sized and shaped to help the leveling plate 310 to translate with respect to the first leveling assembly 130A. For example, the one or more coupling members 340 can engage with walls of the first slot 510, and the engagement defines a range of translation (e.g., sliding) that the leveling plate 310 can translate with respect to the first leveling assembly 130A. For example, the leveling plate 310 can translate between a first position (e.g., raised) and a second position (e.g., lowered).

Figure 6:
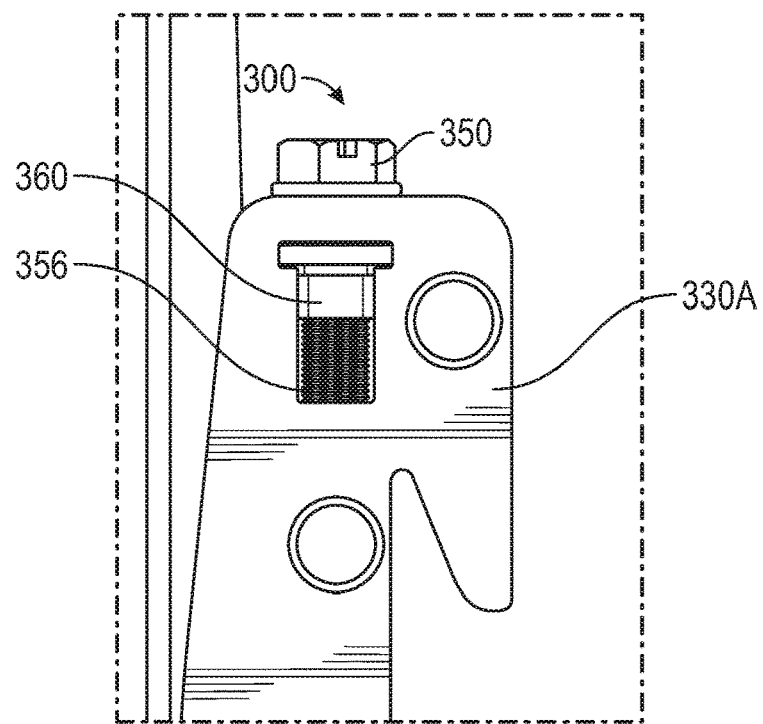
FIGS. 6-7 depict an example of the leveling assembly in various adjustment configurations.
Figure 7:
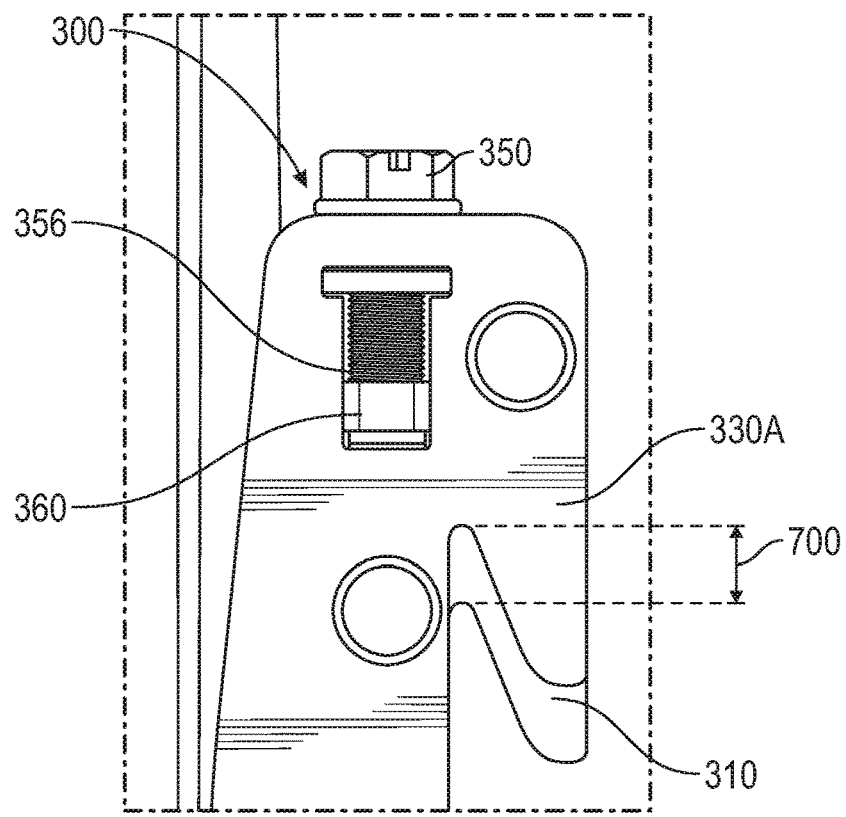

FIGS. 6-7 depict an example of the first leveling assembly in various adjustment configurations. The one or more leveling assemblies 130 (e.g., the first leveling assembly 130A) can include one or more configurations that correspond to the position of the leveling plate 310 relative to first leveling assembly 130A (e.g., a raised or lowered position). The adjustment assembly 300 can be utilized to change the one or more configurations of the first leveling assembly 130A. For example, the driving block 360 can translate along the shank 356 of the adjustor 350, and the driving block 360 can translate the leveling plate 310 with respect to the first leveling assembly 130A. The leveling plate 310 can translate within a range of translation (e.g., translate between a first position and a second position).

The one or more configurations can include a first configuration (e.g., raised) and a second configuration (e.g., lowered). The first leveling assembly 130A is in the first configuration in FIG. 6, and the leveling plate 310 is obscured from view by the first support plate 330A. FIG. 7 shows the first leveling assembly 130A in the second configuration, and the leveling plate projects from a lower portion of the leveling assembly 130A. The leveling plate 310 can translate with respect to (e.g., project from, extend from, or the like) the first leveling assembly 130A, and the leveling plate 310 can engage with the first support rail 120 (shown in FIGS. 1 and 3). The translation of the leveling plate 310, and the engagement of the leveling plate 310, can change the position of the first leveling assembly 130A with respect to the support frame 110.

In an example, the first leveling assembly 130A can be in the first configuration (shown in FIG. 6) and engaged with the first support rail 120 (shown in FIGS. 1 and 3). The adjustment assembly 300 can be manipulated, and the leveling plate 310 can translate with respect to the first leveling assembly 130A. As the leveling plate 310 translates, a gap 700 can form between the hook portion 140 of the leveling plate 310, and the hook portion 140 first support plate 320A (or the second support plate 320B, shown in FIG. 3). The position of the first leveling assembly 130A with respect to the support frame 110 changes with the translation of the leveling plate 310 because the leveling plate 310 engages with the first support rail 120 as the gap 700 between remaining portions of the first leveling assembly 130A increases. The translation of the leveling plate 310 can cause the overall height of first leveling assembly 130A to change (e.g., an increase or decrease in height according to the position of the leveling plate 310 with respect to the first leveling assembly 130A). Accordingly, the position or orientation of the display bracket 150 (and an electronic display) can be changed by configuring the first leveling assembly 130A in the one or more configurations.

The hook portion 140 of the first support plate 330A (and the second support plate 330B, shown in FIGS. 3 and 5) can disengage from the first support rail 210 in the one or more configurations, however the hook portion 140 of the support plate 330A can remain positioned in the channel 113 of the support frame 110 (shown in FIG. 1). Maintaining the position of the hook portion 140 of the first support plate 330A in the channel 113 can help the first leveling assembly 130A remain coupled to the first support rail 120.

Figure 8:
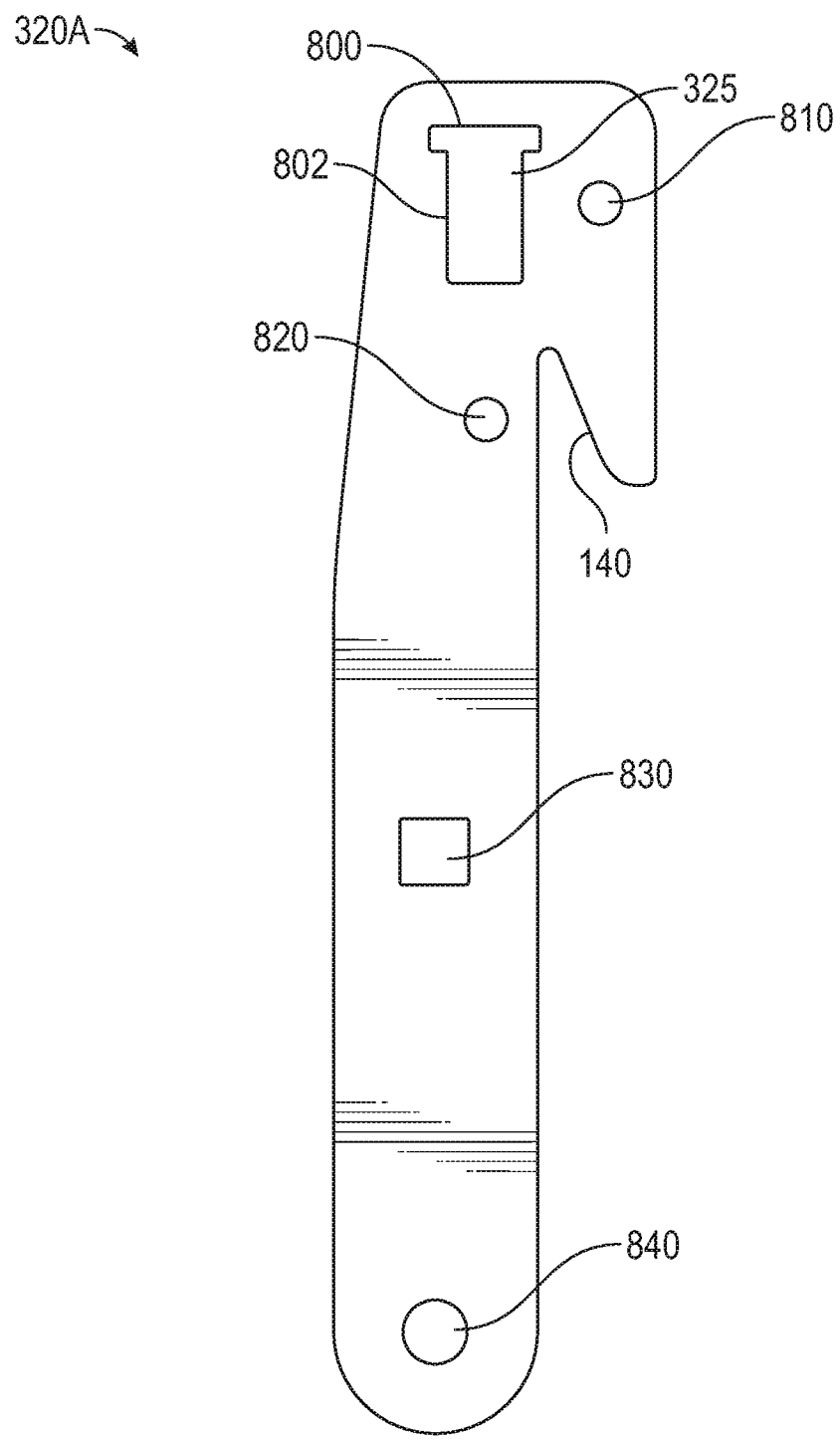
FIG. 8 depicts an example of a first support plate.

FIG. 8 depicts an example of the first support plate 320A. The first support plate 320A can be substantially the same as the second support plate 320B (e.g., substantially the same size, shape, profile, or the like). As described in this document, the first support plate 320A can define the socket 325 and the hook portion 140. The hook portion 140 can engage with the first support rail 120 (shown in FIG. 3). The socket 325 can be sized and shaped to receive portions of the adjustor 350 (shown in FIG. 10). For instance, a first wall 800 of the socket 325 can engage with the second flange 354 of the adjustor 350 (shown in FIGS. 3 and 5). Additionally, the socket 325 can be sized and shaped to receive portions of the driving block 360 (shown in FIG. 12). For instance, a second wall 802 of the socket can engage with the driving block 360.

The first support plate 320A can include one or more through holes, for instance a first hole 810, a second hole 820, a third hole 830, and a fourth hole 840. The first hole 810 the second hole 820, the third hole 830, and the fourth hole 840 can be sized and shaped to receive the one or more coupling members 340 (shown in FIG. 3). The first hole 810 can be laterally offset from the second hole 820. As discussed in greater detail in this document, the first hole 810 and the second hole 820 can correspond with (e.g., are aligned or configured to align) other components of the first leveling assembly 130A (e.g., the first slot 510 of the leveling plate 310, shown in FIG. 5).

Figure 13:
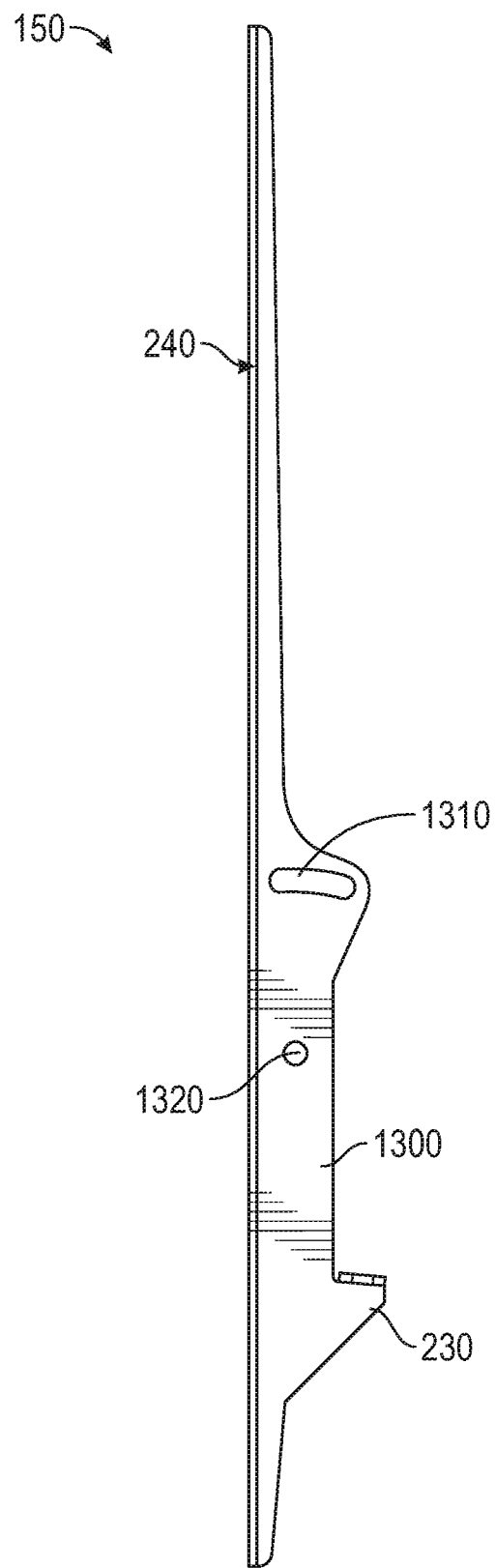
FIG. 13 depicts an example of the display bracket.

Additionally, the third hole 830 and the fourth hole 840 can correspond with other components of the first leveling assembly 130A (e.g., the display bracket 150 shown in FIG. 13). The third hole can 830 can define a geometric shape (e.g., square, rectangular, polygonal, or the like) and the third hole 830 can be configured to prevent rotation of the locking member 410 (shown in FIG. 4) and help fix the position of the display bracket 150 (shown in FIG. 2). Further, the fourth hole 840 can help the facilitate the tilting of the display bracket 150 (e.g., the display bracket 150 can rotate about the axle 430 and the fourth hole 840).

Figure 9:
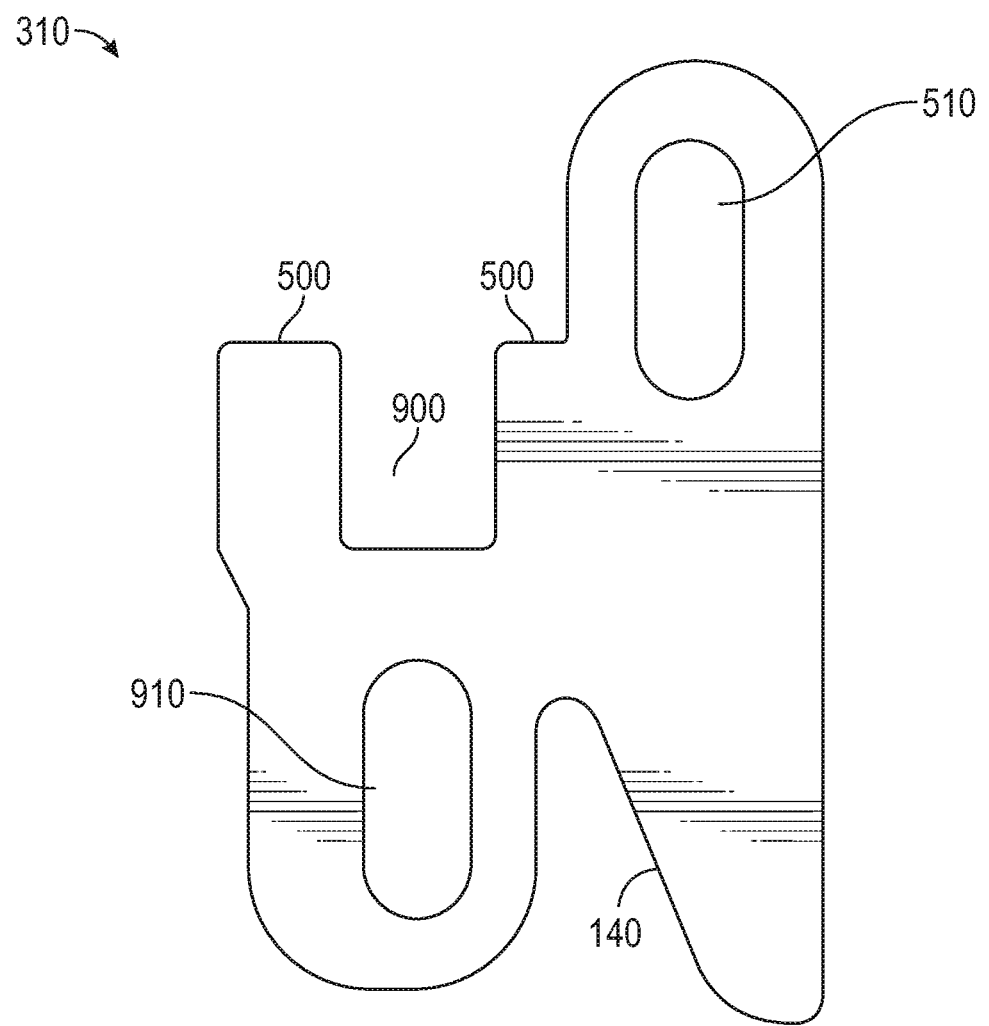
FIG. 9 depicts an example of a leveling plate.

FIG. 9 depicts an example of the leveling plate 310. The leveling plate 310 can include the hook portion 140, and the hook portion 140 can engage with the first support rail 120 (shown in FIG. 3).

The leveling plate 310 can define a recess 900, and the recess 900 can be sized and shaped to receive the adjustor 350, including (but not limited to) the shank 356 (shown in FIG. 5). Additionally, in some example configurations, the recess 900 can facilitate the engagement of the driving block 360 (shown in FIG. 5) with the leveling plate 310. For example, the recess 900 can allows the driving block 360 to translate with respect to the adjustor 350 and engage with the edge 500 of the leveling plate 310. Further, the recess 900 can decrease the size of the first leveling assembly 130 (shown in FIG. 5).

As discussed in this document, the leveling plate 310 can define a first slot 510. Additionally, the leveling plate 310 can define a second slot 910. The first slot 510 and the second slot 910 can correspond with other components of the first leveling assembly. For example, the first slot 510 can correspond with the first hole 810. Further, the second slot 910 can correspond with the second hole 920. In another example, the second slot 910 is colinear with the recess 900.

The first slot 510 and the second slot 910 can help facilitate the translation of the leveling plate with respect to the first leveling assembly 130A (e.g., between the configurations shown in FIGS. 6 and 7). The one or more coupling members 340 can be inserted through the first slot 510 and the second slot 910 to help retain the leveling plate 910 within the first leveling assembly 130A, and help limit the translation of the leveling plate 910 relative to the first leveling assembly 130A.

The first slot 510 and the second slot 910 can be laterally offset (e.g., horizontally or vertically spaced). Laterally offsetting the first slot 510 from the second slot 910 can help prevent the rotation (e.g., rocking) of the leveling plate 310 with respect to the first leveling assembly 130A. Accordingly, the lateral offsetting of the first slot 510 from the second slot 910 can help improve the engagement of the hook portion 140 with the first support rail 120 (shown in FIG. 1).

Figure 10:
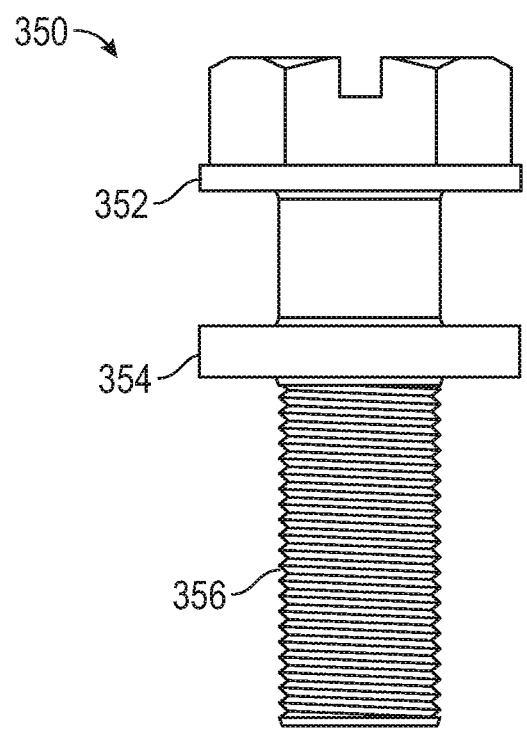
FIG. 10 depicts an example of an adjustor.

FIG. 10 depicts an example of the adjustor 350. The adjustor 350 can include the first flange 352 and the second flange 354. The first flange 352 can be spaced from the second flange 354. The first flange 352 can define driving features configured to allow a user to manipulate the adjustor 350 (e.g., with fingers, a screwdriver, a wrench, or the like).

Portions of the one or more leveling assemblies 130 (e.g., the first leveling assembly 130A) can be positioned between the first flange 352 and the second flange 354. For example, a portion of the first support plate 320A and the second support plate 320B can be positioned between the first flange 352 and the second flange 354, and the coupling of the first leveling assembly 130A (e.g., with the one or more coupling members 340) can retain the first support plate 320A and the second support plate 320B between the first flange 352 and the second flange 354. The retention of portions of the first leveling assembly 130A between the first flange 352 and the second flange 354 can help facilitate the translation of the leveling plate 310 relative to the first leveling assembly 130A.

Further, the adjustor 350 can include the shank 356. The shank 356 can define threads, and the driving block 360 (shown in FIG. 3) can engage with the adjustor 350. The driving block 360 can translate with respect to the adjustor 350, and the adjustment assembly 300 (shown in FIG. 3) can engage with the leveling plate 310 (shown in FIG. 5) to translate the leveling plate relative to the first leveling assembly 130A.

Figure 11:
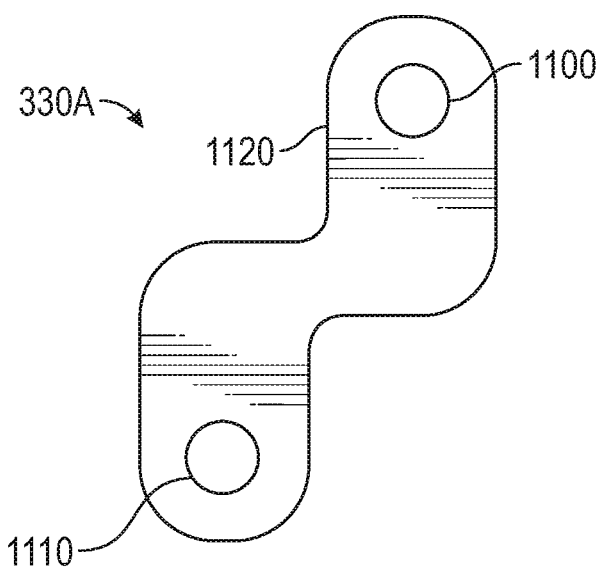
FIG. 11 depicts an example of a spacer.

FIG. 11 depicts an example of the spacer 330A. The spacer 330A can be substantially the same as the second spacer 330B. The spacer 330A can define a fifth hole 1100 and a sixth hole 1110. The fifth hole 1100 can correspond with the first hole 810 of the first support plate 320A (shown in FIG. 8), and can correspond with the first slot 510 of the leveling plate 310 (shown in FIG. 9). Additionally, the sixth hole 1110 can correspond with the second hole 820 of the first support plate 320A, and can correspond with the second slot 910 of the leveling plate 310. Accordingly, the fifth hole 1100 can be laterally offset from the sixth hole 1110.

The spacer 330A can define a notch 1120, and the notch 1120 can help facilitate the translation of the leveling plate 310 with respect to the first leveling assembly 310 (shown in FIG. 3). For example, the notch 1120 can receive the driving block 360 (shown in FIG. 5), and help facilitate the translation of the driving block 360 with respect to the first leveling assembly 130A.

Figure 12:
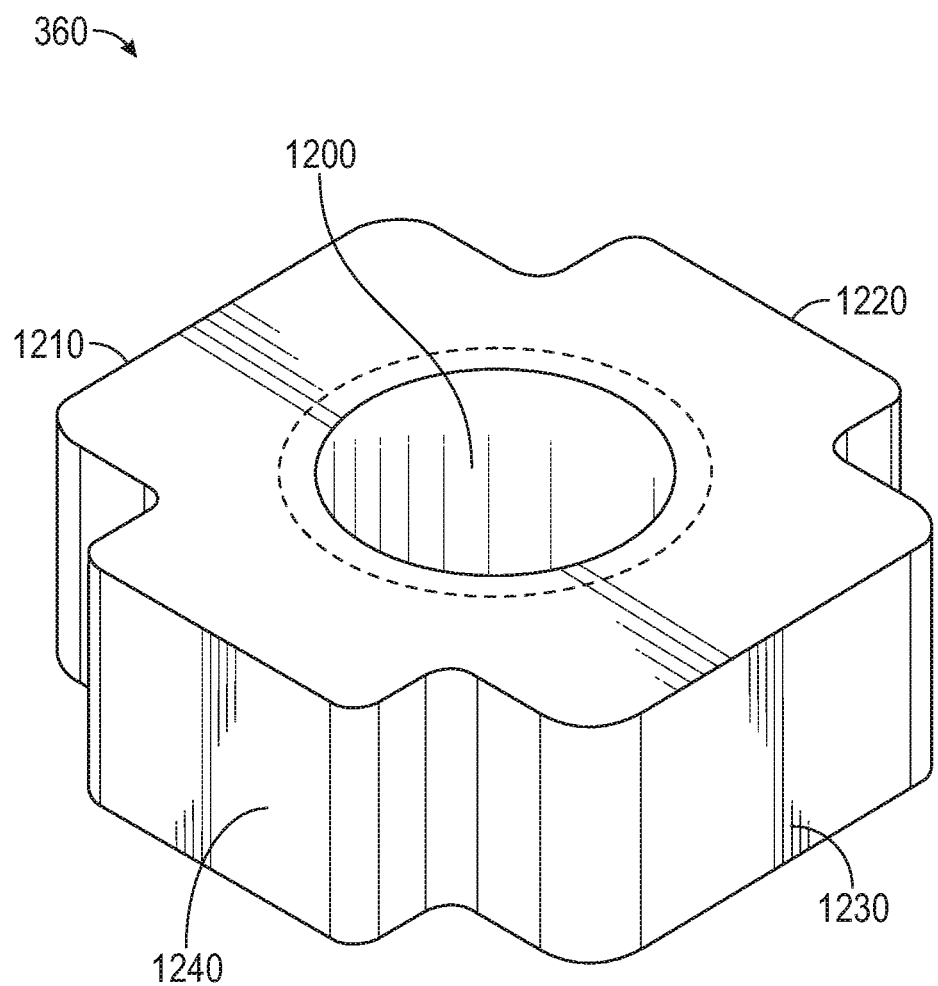
FIG. 12 depicts an example of a driving block.

FIG. 12 depicts an example of the driving block 360. The driving block 360 can define an adjustment hole 1200, and the adjustment hole 1200 can engage (e.g., a threaded engagement) with the adjustor 150 (shown in FIG. 1).

The driving block 360 can define a first portion 1210 (e.g., a projection), a second portion 1220, a third portion 1230, and a fourth portion 1240. The first portion 1210 and the third portion 1230 can be positioned between the first support plate 130A and the second support plate 130B (shown in FIG. 3). The first portion 1210 and the third portion 1230 can engage with the leveling plate 310, including (but not limited to) the edge 500 (shown in FIG. 3).

The second portion 1220 and the fourth portion 1240 can be positioned in the socket 325 of the first support plate 320A (or the second support plate 320B). The socket 325 can prevent the rotation of the driving block 360 with respect to the first leveling assembly 130A, and accordingly helps the driving block 360 to translate (e.g., linearly translate) with respect to the adjustor 350 (shown in FIG. 5). For example, the second portion 1220 and the fourth portion 1240 can engage with the second wall 802 (shown in FIG. 8) of the socket 325 and the engagement with the second wall 802 prevents the rotation of the driving block 360.

FIG. 13 depicts an example of the display bracket 150. The mounting bracket 130 can include a mounting surface 240 and is configured to couple with an electronic display, for instance, by being compatible with the VESA standard.

Additionally, the display bracket 150 can define a flange 1310. A tilt slot 1310, a tilt hole 1320, and the tab 230 can be defined by the flange 1310. The tilt slot 1310 and the tilt hole 1320 can facilitate the tilting of the display bracket 150 relative to the first leveling assembly 130A (and the wall 200, shown in FIG. 2). For example, the axle 430 can be positioned in the tilt hole 1320, and the display bracket 150 can rotate about the axle 430 (shown in FIG. 4) and the tilt hole 1320. The locking member 410 can be positioned in the tilt slot 1320, and the locking member 1320 can engage with walls of the tilt slot 1320 to define a range of tilt for the wall mounting bracket assembly 100.

Figure 14:
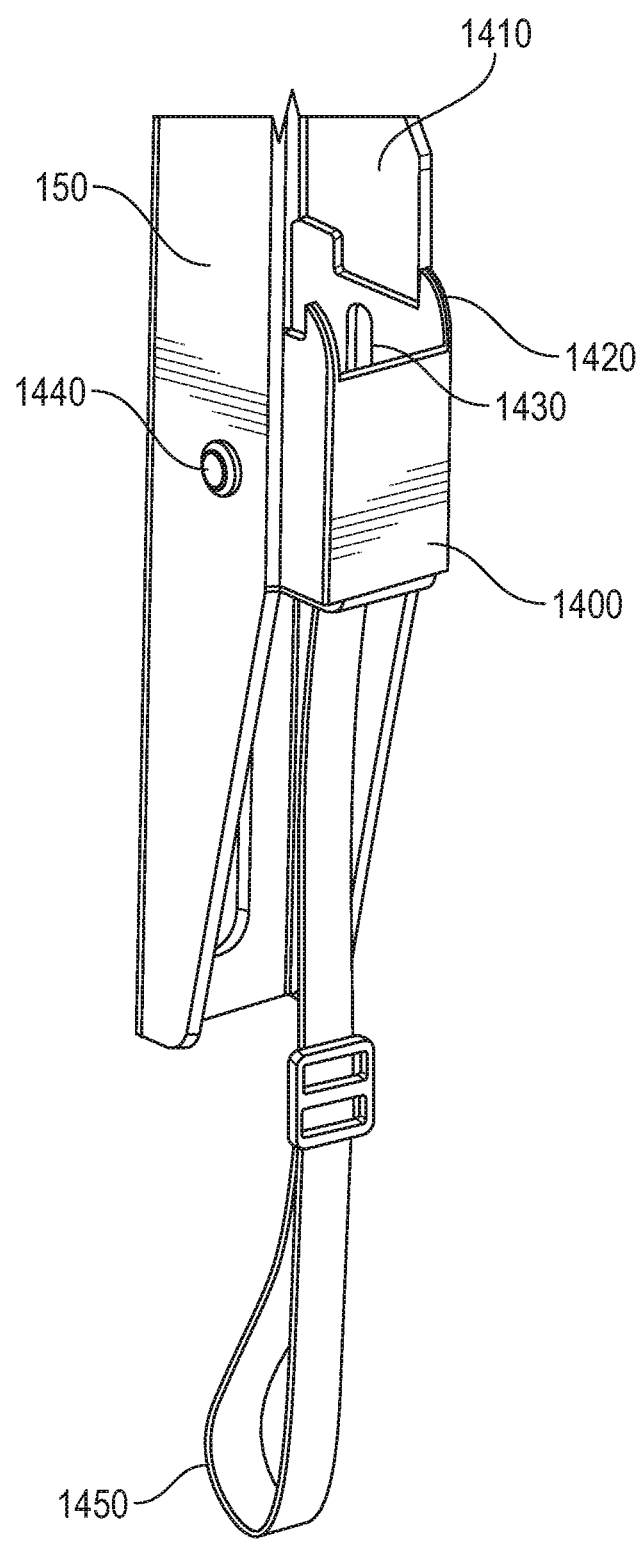
FIG. 14 depicts an example of the display bracket 150 including a sliding bracket 1400.

FIG. 14 depicts an example of the display bracket 150 optionally including a sliding bracket 1400. The display bracket 150 can define a bracket channel 1410, and the bracket channel 1410 can be sized and shaped to receive the sliding retention bracket 1400. The sliding retention bracket 1400 can define a retention hook 1420, and the retention hook 1420 can be configured to engage with the support frame 110 (e.g., the second support rail 210 shown in FIG. 2). The sliding retention bracket 1400 can be configured to couple the display bracket 150 (and the one or more leveling assemblies) with the support frame 110. For example, the engagement of the retention hook 1420 with the second support rail 210 can help couple the first leveling assembly 130A with the support frame 110.

The sliding retention bracket 1400 can be positioned in the bracket channel 1420. The sliding retention bracket 1400 can be slidably coupled with the display bracket 150. For example, the sliding bracket 1400 can define a retention bracket slot 1430, and the display bracket 150 can define a through hole. The positioning of the sliding retention bracket 1400 in the bracket channel 1410 can align the retention bracket slot 1430 with the through hole in display bracket 150. A coupling member, for example a pin 1440, can be positioned in the through hole defined by the display bracket 150. The pin 1440 can be positioned in the retention bracket slot 1430. The pin 1440 can engage with walls of the retention bracket slot 1430, and the pin 1440 can couple the sliding retention bracket 1400 with the display bracket 150. Accordingly, the pin 1440 can facilitate the slidable coupling of the sliding retention bracket 1400 with the display bracket 150, and the sliding retention bracket 1400 can translate with respect to the display bracket 150. An operator 1450 (e.g., a handle, a tether, or the like) can be coupled to the sliding retention bracket 1400, and movement (e.g., manipulation) of the operator 1450 can translate the sliding retention bracket 1400 with respect to the display bracket 150.

Figure 15:
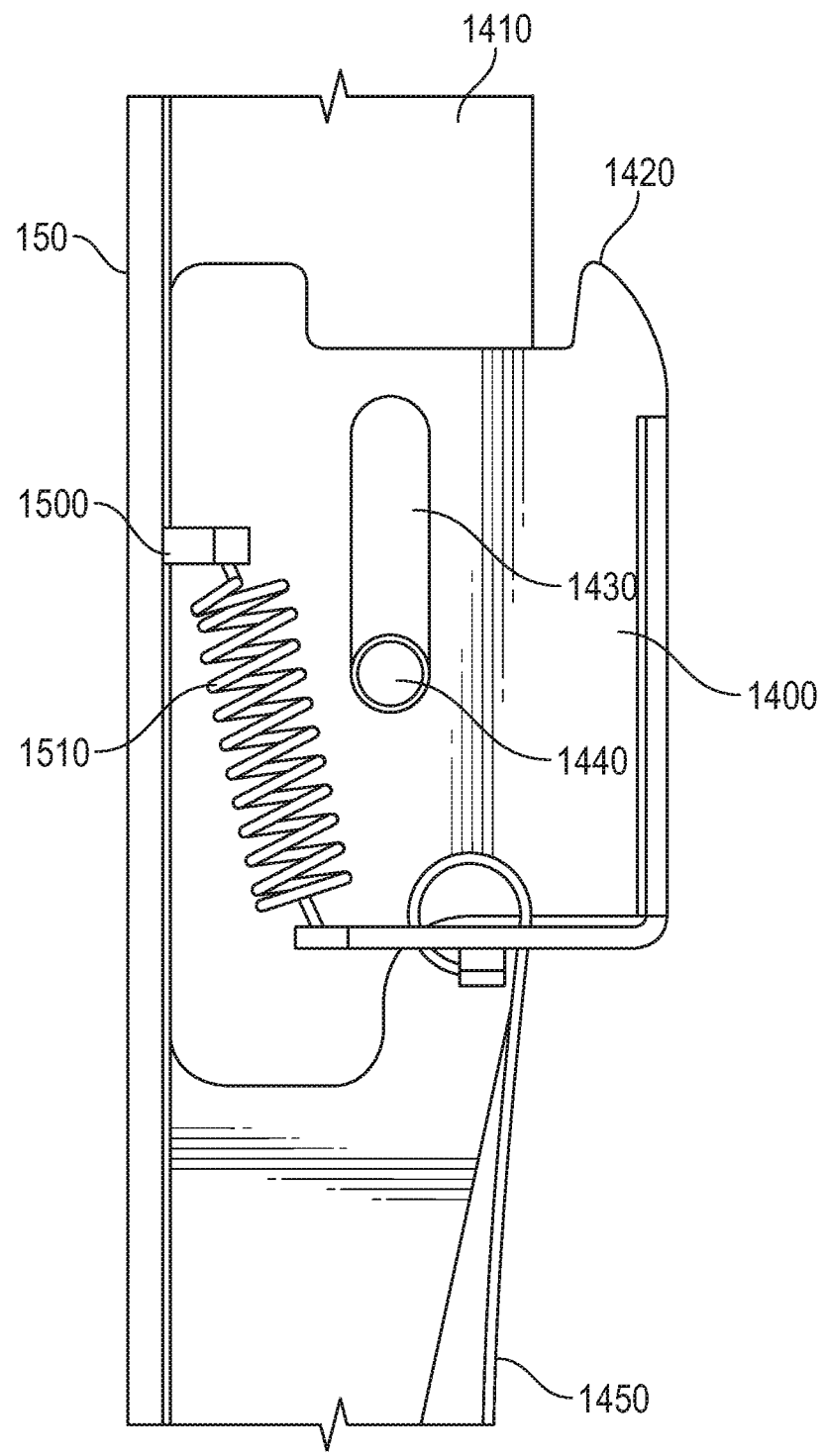
FIG. 15 is a detailed perspective view of the sliding bracket 1400 of FIG. 14.

FIG. 15 is a detailed perspective view of the sliding bracket 1400 of FIG. 14. The display bracket 150 can define a biasing tab 1500. The biasing tab 1500 can be configured to couple with a biasing member 1510 (e.g., a spring) and the biasing member 1510 can bias (e.g., spring-load) the sliding retention bracket 1400 in a retaining configuration. For example, the biasing member 1510 can be coupled between the biasing tab 1500 and the sliding retention bracket 1400. The biasing member 1510 can bias the sliding retention bracket 1400 toward (or away from) the biasing tab 1500. In another example, the biasing member 1510 biases the retention hook 1420 toward the support frame 110 (e.g., the second support rail 210) and the retention hook 1420 engages with the support frame and thereby couples the display bracket 150 (and the one or more leveling assemblies) with the support frame 110.

Movement (e.g., pulling) of the operator 1450 can overcome a biasing force provided by the biasing member 1510, and the sliding retention bracket 1400 can translate (e.g., slide) with respect to the display bracket 150. Accordingly, the sliding retention bracket 1400 can include an unlocked configuration. In the unlocked configuration, the retention hook 1420 can be disengaged from the support frame 110, and the display bracket 150 can optionally be decoupled from the support frame 110.

Various Notes & Examples

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A wall mounting bracket assembly adapted to support an electronic display, comprising:
   a support frame adapted to couple to a vertical surface; the support frame including a first support rail;
   a first leveling assembly having a first hook portion adapted to engage with the first support rail, the first leveling assembly including:
      a first pair of support plates, including:
         a first support plate defining a first socket and positioned on a first side of the first leveling plate;

a second support plate defining a second socket and positioned on a second side of the first leveling plate;
a first leveling plate positioned between the first pair of support plates, the first pair of support plates adapted to translate with respect to the first leveling plate; and
a first adjustment assembly, including:
a first driving block configured to engage with the first leveling plate, and
a first adjustor having a flange, and a portion of the flange is configured to be positioned in the first socket and the second socket, and wherein:
the flange is configured to engage with the first pair of support plates; and
the first adjustor is moveably engaged with the first driving block, and movement of the first adjustor relative to the first driving block is configured to translate the first pair of support plates with respect to the first leveling plate; and
a second leveling assembly having a second hook portion adapted to engage with the first support rail, the second leveling assembly including:
a second pair of support plates;
a second leveling plate positioned between the second pair of support plates, the second pair of support plates adapted to translate with respect to the second leveling plate; and
a second adjustment assembly, including a second driving block configured to engage with the second leveling plate, wherein the second driving block is moveably engaged with a second adjustor, wherein movement of the second adjustor relative to the second driving block is configured to translate the second pair of support plates with respect to the second leveling plate.

2. The wall mounting bracket assembly of claim 1, wherein:
the driving block is positioned between the first support plate and the second support plate;
the driving block is adapted to translate in the first socket and the second socket; and
the first adjustor engages with the driving block to translate the first leveling plate with respect to the first support plate and the second support plate.

3. The wall mounting bracket assembly of claim 2, wherein the first driving block includes:
a first portion positioned in the first socket;
a second portion positioned in the second socket;
a third portion positioned between the first support plate and the second support plate; and
a fourth portion positioned between the first support plate and the second support plate; and
wherein the third portion and the fourth portion engage with the first leveling plate to translate the first leveling plate with respect to the first support plate and the second support plate.

4. The wall mounting bracket assembly of claim 2, wherein the first leveling plate is configured to translate with respect to the flange of the first adjustor.

5. The wall mounting bracket assembly of claim 1, wherein the first leveling plate defines a recess configured to receive a shank of the first adjustor.

6. The wall mounting bracket assembly of claim 1, wherein the first driving block translates along a shank of the first adjustor.

7. The wall mounting bracket assembly of claim 1, wherein:
the first leveling plate defines a first slot and a second slot; and
the first leveling assembly includes:
a first coupling member positioned in the first slot;
a second coupling member positioned in the second slot;
wherein the first coupling member and the second coupling member couple the first support plate, the first leveling plate, and the second support plate; and
wherein the first coupling member and the second coupling member are adapted to translate within the first slot and the second slot, respectively.

8. The wall mounting bracket assembly of claim 7, wherein the first slot is laterally offset from the second slot.

9. The wall mounting bracket assembly of claim 1, further comprising a first spacer and a second spacer, wherein the first spacer is positioned between the first support plate and the first leveling plate, and the second spacer is positioned between the second support plate and the first leveling plate.

10. A wall mounting bracket assembly adapted to support an electronic display, comprising:
a support frame adapted to couple to a vertical surface, the support frame including a first support rail;
a first leveling assembly having a first hook portion adapted to engage with the first support rail, the first leveling assembly including:
a first pair of support plates, including:
a first support plate defining a first socket and positioned on a first side of the first leveling plate;
a second support plate defining a second socket and positioned on a second side of the first leveling plate;
a first leveling plate positioned between the first pair of support plates, the first support plate and the second support plate adapted to translate with respect to the first leveling plate; and
a first adjustment assembly, including a first driving block moveably engaged with a first adjustor, wherein the first adjustment assembly is configured to engage with the first leveling plate and to translate the first support plate and the second support plate with respect to the first leveling plate, wherein:
the first driving block is positioned between the first support plate and the second support plate;
the first driving block is adapted to translate in the first socket and the second socket; and
the first adjustor engages with the driving block to translate the first leveling plate with respect to the first support plate and the second support plate; and
a second leveling assembly having a second hook portion adapted to engage with the first support rail, the second hook assembly including:
a second pair of support plates;
a second leveling plate positioned between the second pair of support plates, the second pair of support plates adapted to translate with respect to the second leveling plate; and
a second adjustment assembly including a second driving block configured to engage with the second leveling plate, wherein the second driving block is moveably engaged with a second adjustor, wherein the second adjustment assembly is configured to engage with the second leveling plate and to translate the second pair of support plates with respect to the second leveling plate.

11. The wall mounting bracket assembly of claim 10, wherein the driving block is in threaded engagement with the first adjustor.

12. The wall mounting bracket assembly of claim 10, further comprising a display bracket configured to tilt with respect to the first leveling assembly.

13. The wall mounting bracket assembly of claim 10, further comprising a display bracket including a sliding retention bracket configured to couple the display bracket with the support frame, wherein:
 the display bracket defines a bracket channel sized and shaped to receive the sliding retention bracket; and
 the sliding retention bracket is positioned in the bracket channel, and the sliding retention bracket is slidably coupled with the display bracket.

\* \* \* \* \*

UNITED STATES PATENT AND TRADEMARK OFFICE
CERTIFICATE OF CORRECTION

PATENT NO. : 11,105,458 B2
APPLICATION NO. : 16/490421
DATED : August 31, 2021
INVENTOR(S) : Runger et al.

It is certified that error appears in the above-identified patent and that said Letters Patent is hereby corrected as shown below:

In the Specification

In Column 4, Line 20, delete "such" and insert --(such-- therefor

In Column 6, Line 38, delete "e.g.," and insert --(e.g.,-- therefor

In Column 7, Line 67, delete "300." and insert --350.-- therefor

In Column 8, Line 23, delete "300" and insert --350-- therefor

In Column 8, Line 59, delete "360," and insert --360.-- therefor

In Column 9, Line 19, delete "260." and insert --360.-- therefor

In Column 9, Line 29, delete "320" and insert --325-- therefor

In Column 10, Line 67, delete "430" and insert --130A-- therefor

In Column 11, Line 13, delete "500" and insert --310-- therefor

In Column 12, Line 20, delete "330B," and insert --320B,-- therefor

In Column 12, Line 21, delete "210" and insert --120-- therefor

In Column 13, Line 14, delete "130" and insert --130A-- therefor

In Column 13, Line 29, delete "910" and insert --310-- therefor

In Column 13, Line 31, delete "910" and insert --310-- therefor

Signed and Sealed this
Second Day of August, 2022

Katherine Kelly Vidal
*Director of the United States Patent and Trademark Office*

CERTIFICATE OF CORRECTION (continued)
U.S. Pat. No. 11,105,458 B2

In Column 14, Line 17, delete "310" and insert --130A-- therefor

In Column 14, Line 25, delete "150" and insert --350-- therefor

In Column 14, Line 30, delete "130A" and insert --320A-- therefor

In Column 14, Line 30, delete "130B" and insert --320B-- therefor

In Column 14, Line 50, delete "1310." and insert --1300.-- therefor

In Column 14, Line 51, delete "1310." and insert --1300.-- therefor

In Column 14, Line 58, delete "1320," and insert --1310,-- therefor

In Column 14, Line 58, delete "1320" and insert --410-- therefor

In Column 14, Line 59, delete "1320" and insert --1310-- therefor

In Column 15, Line 9, delete "1420." and insert --1410.-- therefor

In the Claims

In Column 16, Line 60, in Claim 1, delete "surface;" and insert --surface,-- therefor